(No Model.)
H. J. MILLAR.
COMBINED REEL AND TRANSPORTATION CASE.
No. 384,329. Patented June 12, 1888.
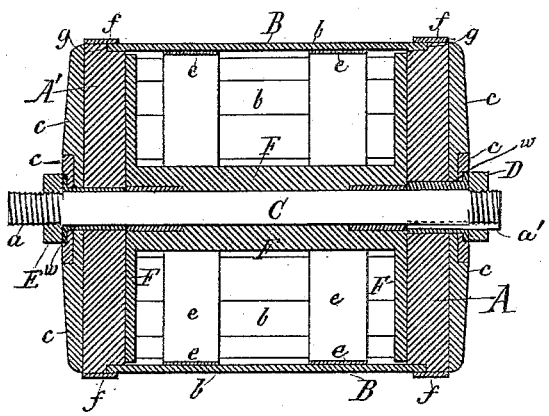
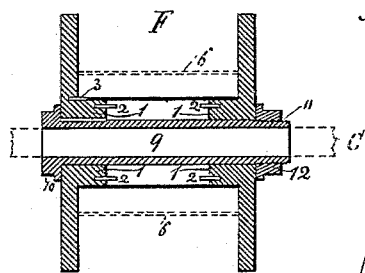
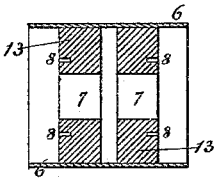
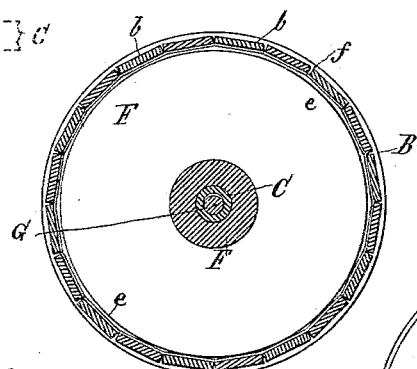
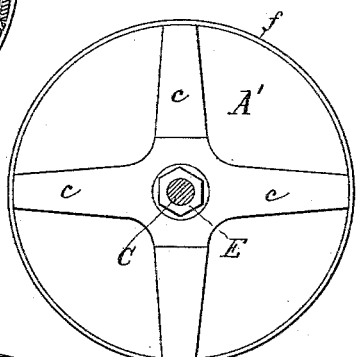
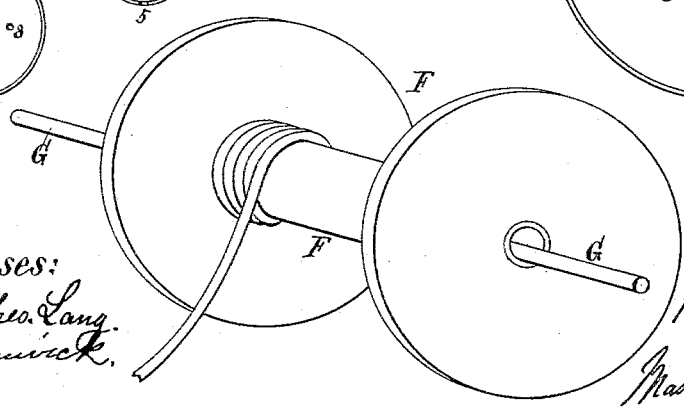
Witnesses:
J. P. Theo. Lang
E. J. Fenwick
Inventor:
Henry J. Millar
by his attys
Mason, Fenwick & Lawrence

UNITED STATES PATENT OFFICE.

HENRY J. MILLAR, OF UTICA, NEW YORK.

COMBINED REEL AND TRANSPORTATION-CASE.

SPECIFICATION forming part of Letters Patent No. 384,329, dated June 12, 1888.

Application filed April 13, 1888. Serial No. 270,539. (No model.)

*To all whom it may concern:*

Be it known that I, HENRY J. MILLAR, a citizen of the United States, residing at Utica, in the county of Oneida and State of New York, have invented certain new and useful Improvements in a Combined Reel and Transportation-Case; and I do hereby declare the following to be a full, clear, and exact description of the invention, such as will enable others skilled in the art to which it appertains to make and use the same.

My invention consists in certain novel constructions and combinations of parts, as will be hereinafter described, and pointed out in the claim, whereby a very simple, convenient, durable, and useful combined pipe-reel and packing-case is produced, the same admitting of one of the heads and the inclosing body portion of the case and the reel being readily removed from the central tie bar or tube, so that the said drum can be placed on a stand or support outside of the case and the pipe to be shipped wound upon it, and then the filled reel, the body portion, and removed head replaced upon the tie bar or tube and all securely confined together for transportation; and when the combined reel and case is received the said head can be moved away from the end of the reel a sufficient distance for the removal of the said body portion and again readjusted and confined in its original position, and the structure thereby adapted for having the pipe unwound from it while it is in position; and when the reel is emptied the body portion of the case can be replaced and the whole returned to the place from whence it was shipped; and when it arrives one of its heads and the body portion and the reel can be again removed from the tie bar or tube, the reel placed upon the stand or support, and a fresh supply of pipe wound upon it, then the filled reel, the head, and the body portion of the case replaced, and the whole secured for transportation.

In the accompanying drawings, Figure 1 is a vertical longitudinal section of my combined pipe-reel and packing-case, the pipe not being shown upon the reel. Fig. 2 is a vertical cross-section of Fig. 1 on a handling-shaft. Fig. 3 is an end view of the case and a cross-section of a tie-bar which is solid instead of tubular, as in Figs. 1 and 2. Fig. 4 is a perspective view of the reel out of the case, and with the handling-shaft shown in Fig. 2 passed through it to serve as an axial shaft, and with a portion of lead pipe wound upon the cylinder of the drum. Figs. 5, 6, 7, 8, and 9 illustrate the parts of the reel modified in their construction, so that they may be separated and a large or small cylinder employed between the drum flanges or heads, accordingly as the lightness or heaviness of the pipe may require.

In the views of the drawings, A A' are two circular heads, and B a sectional body portion of the packing and transportation case. The heads are placed upon a tie-bar, C, made either tubular or solid, as shown, and provided with a shoulder, D, and a screw-thread, $a$, and upon the screw-threaded portion a confining-nut, E, is applied, so as to screw up against the head A'.

The head A bears against the shoulder D, and it and the shoulder may be keyed to the tie-bar C, as at $a'$; or the shoulder may be wrought upon or otherwise connected to the bar, and the head A secured in any other proper manner. The heads are respectively provided with strengthening-hoops, as $f$, and beneath these hoops they are reduced in diameter, so as to form with the hoops circular or nearly circular socket-seats or inclosed shoulders $g\ g$, against which the ends of the staves $b$, of which the body portion B is formed, may abut and bear when said portion is in the position shown. Said heads are also strengthened by cleats $c$, or in any other suitable manner, and where they are fitted upon the tie bar or tube C they may be provided with tubular metallic wear-thimbles $w\ w$. Instead of forming the circular socket seats or shoulders $g\ g$ in the manner shown, these seats or shoulders may be formed in the heads at points below the hoops by simply cutting circular or nearly circular grooves, forming socket-seats adapted for the reception of the ends of the staves $b$. It, however, is preferable to form the socket seats or shoulders by the aid of the hoops.

It will be seen from the drawings that the staves $b$ are connected at all of their edges, except one edge of each of the staves which begin and end the body portion B, by flexible strips $e\ e$, fastened to their inner surfaces, and that joints are thus formed between the staves, whereby the body portion is made capable of assuming a flat form or of being bent into a circular form conforming to the circular shape of the heads or to the seat sockets or shoulders formed thereon, and when thus bent and the heads A A' separated sufficiently can be fitted and confined in the said socket-seats or upon and against the shoulders g g, as shown, or removed therefrom without separating the staves. Other suitable flexible devices—such as, for instance, those shown in my application for a patent filed February 6, 1888, Serial No. 263,096—applied on the inner surfaces of the staves may be adopted for joining the staves.

The head A' has its wear-thimble made of sufficient diameter to slip over the screw-thread of the tie-bar, and said head is intended to be slipped on and off said bar, and this can be done by removing the nut E from the bar. F represents a reel comprising a hollow cylindrical drum with two circular flanges or heads. It is fitted upon the plain portion of the tie-bar and between the heads A A', and arranged to slide on and off said bar clear of the screw-thread a when the nut E and head A' are removed.

This reel is intended to be removed from the tie-bar and placed upon a stand or support and have the pipe wound upon it; and when the reel is placed in a stand an axial shaft, G, may be passed through it, as illustrated in Fig. 2, and it may be revolved upon said shaft by turning it hand over hand. The reel when filled is replaced on the tie-bar and the body portion and head, which were removed in order for its withdrawal, readjusted to their positions, and all confined by the nut E.

The combined reel and case with the pipe in it, as just described, is transported to purchasers, and when received the head A' and body portion are manipulated so as to remove the former entirely out of the way, and then the latter is readjusted on the tie-bar to its position close to the reel and confined by the nut E, thus leaving the pipe in condition for being unwound from the reel while the drum is between the two heads of the case and is free to revolve on the tie-bar.

The ends of the tie-bar may be made to project beyond the heads A A', in order that the case may be lifted with a sling, the rings thereof being slipped upon said ends.

The within-described combined pipe-reel and transportation-case possesses, by reason of its cylindrical form, all the advantages of my improved combined reel and packing-case shown in my application, No. 263,325, and differs otherwise materially from the same in the construction and combination of the parts, whereby the reel such as described and shown herein can be used.

In Fig. 5 the reel F is shown as constructed with a short hub, 1, on each of its heads or flanges, and with pins 2 extending out from said hubs, and with pins 3 extending from one of the heads just beyond the peripheries of the hubs. In Figs. 6 and 7 a longitudinal section and an end view of a small cylinder, 4, are shown. This cylinder has notches 5 at its ends, corresponding to the pins 3, and when it is fitted upon the hubs the pins 3 enter the notches and hold the cylinder from turning. In Figs. 8 and 9 views of a larger cylinder, 6, are shown. This cylinder is stayed by internal circular disks, 13, provided with a central tie-tube passage, 7, and with pin-sockets 8, as shown, and when it is in place between the heads of the drum the pins 2 enter the sockets 8 and hold the cylinder from turning.

The heads and the cylinder of the reel are tied together by a tube, 9, provided with a collar, 10, and a screw-thread, 11, and a nut, 12, screwed upon the screw-thread 11, as shown. This modified construction of the reel is very useful, for the larger cylinder can be employed when thin light pipe, which is liable to become too much flattened when wound on a small cylinder, is to be packed and transported, and the smaller cylinder used when thick heavy pipe is to be packed and transported. This feature of construction, whereby two sizes of cylinders can be used to suit the different kinds of pipe, will also be found useful in connection with the combined reel and transportation-case shown in my application, No. 263,325, and I contemplate using it in that relation.

I do not under this patent claim specifically the flexible cylindrical body portion nor the heads provided with hoops to aid in forming seat sockets or shoulders for the ends of the staves, nor a central tie-bar with shoulder, screw-thread, and nut, nor the movable head of the case; but

What I claim is—

The combination of the tie-bar C, either tubular or solid, screw-threaded, and provided with a shoulder and a nut, the heads A A', the body portion B, and the reel F, substantially as and for the purpose described.

In testimony whereof I hereunto affix my signature in presence of two witnesses.

HENRY J. MILLAR.

Witnesses:
JOHN MACGILL,
LEONARD FLEISHMAN.